United States Patent [19]
Giger

[11] 3,842,592
[45] Oct. 22, 1974

[54] ARRANGEMENT FOR SECURING THE HAIRSPRING STUD ON A WATCH FRAME PART

[75] Inventor: Urs Giger, Solothurn, Switzerland

[73] Assignee: Eta A.G. Ebauches-Fabrik, Grenchen, Switzerland

[22] Filed: Jan. 8, 1974

[21] Appl. No.: 431,778

[30] Foreign Application Priority Data
Jan. 12, 1973 Switzerland............................ 452/73

[52] U.S. Cl. ................................................ 58/115
[51] Int. Cl. .......................................... G04b 17/32
[58] Field of Search ....................................... 58/115

[56] References Cited
UNITED STATES PATENTS
1,136,950  4/1915  Freistauter............................ 58/115
3,553,956  1/1971  Schwartz et al. ..................... 58/115
FOREIGN PATENTS OR APPLICATIONS
255,472  3/1948  Switzerland.......................... 58/115

Primary Examiner—Edith Simmons Jackmon
Attorney, Agent, or Firm—Stevens, Davis, Miller & Mosher

[57] ABSTRACT

The hairspring stud 6 has an annular groove 12 provided therearound. The side face 14 of the groove 12 is perpendicular to the stud axis and the side face 13 thereof is frusto-conical. Stud 6 is inserted in a guiding slot having side faces 8 lying on resilient arms 9 of a stud holder. The edges 10 and 11 of faces 8 are rectilinear and evenly beveled. Stud 6 urges arms 9 slightly away from one another in a direction perpendicular to the stud axis. Arms 9 are consequently bent so that they exert a clamping action on stud 6 through edge 11 engaging the frusto-conical stud face 13, thereby exerting forces on stud 6 having components along the stud axis, which cause the stud plane face 14 to be pressed on the coplanar side faces 20 of arms 9 while simultaneously ensuring stud 6 to be perpendicular to the stud holder.

5 Claims, 2 Drawing Figures

3,842,592

PATENTED OCT 22 1974

ARRANGEMENT FOR SECURING THE HAIRSPRING STUD ON A WATCH FRAME PART

BACKGROUND OF THE INVENTION

1. Field of the Invention

This invention relates to a set for watches, which is composed of a frame part and a hairspring stud being adjustably carried by and having an axis perpendicular to said frame part, and more particularly to an arrangement for securing the hairspring stud in adjusted position on said frame part.

2. Description of the Prior Art

The stud securing arrangements of that type, which are known in the art, have the advantage of permitting the hairspring to be perfectly centered after its mounting in the watch while avoiding the delicate correction of the hairspring which, with arrangements of other types comprises a hairspring stud lodging at a predetermined distance from the axis of the balance-wheel, has to be carried out, if, after counting of the hairspring, the outer end of its pulsing portion or counting-point does not lie at that predetermined distance from the balance axis.

The known stud securing arrangements had, however, the drawback that they comprised a locking screw associated with the stud which was moreover constituted as a slider. In comparison with the conventional watch sets having no adjustable hairspring stud, the known sets permitting the hairspring stud to be secured at the desired distance from the balance axis were substantially more expensive; assembling the same was more intricate and they did not offer any garanty against an inopportune unlocking of the stud locking screw.

Several types of locking devices, in which an inopportune release of the locking action has been excluded, are truly known in the art. With these known devices the hairspring stud is nipped by a pair of resilient arms. Notches are formed in these arms to receive the hairspring stud. To hold it perpendicular to these arms, i.e., parallel to the balance axis, said arms were thick in order to grip the stud over a length sufficient for a reliable alignment.

The notches formed in the resilient arms nipping the hairspring stud have, however, the drawback of imposing the distance of the stud from the balance axis. Moreover, the stud holder can only be machined by cutting, because of the great thickness of the stud nipping arms, the manufacture of the stud holder being accordingly expensive and the choice of a good springy material therefor being actually excluded.

SUMMARY OF THE INVENTION

It is therefore an object of the invention to provide a stud securing arrangement of the type indicated above which avoids the drawbacks above-mentioned of the known arrangements.

It is a more peculiar object of the invention to make the watch frame part holding the hairspring stud with overall the same thickness and out of a good springy material and integral with a pair of resilient arms defining between them a guiding slot for the hairspring stud which is provided with an annular groove having a plane and a frusto-conical side face, securing the stud in adjusted position within the guiding slot of the stud holder thereby occuring through one pair of inner edges of said arms, which engage the conical side face of the stud groove thus urging the stud in direction of the axis and causing the plane side face of the stud groove to be strongly pressed on coplanar side surface of the stud holder arms.

Further objects of the invention will become apparent in the course of the following description.

BRIEF DESCRIPTION OF THE DRAWINGS

One embodiment of the improved stud securing arrangement according to the invention is represented diagrammatically and by way of example in the accompanying drawings in which.

DESCRIPTION OF THE PREFERRED EMBODIMENT

Figure 1:
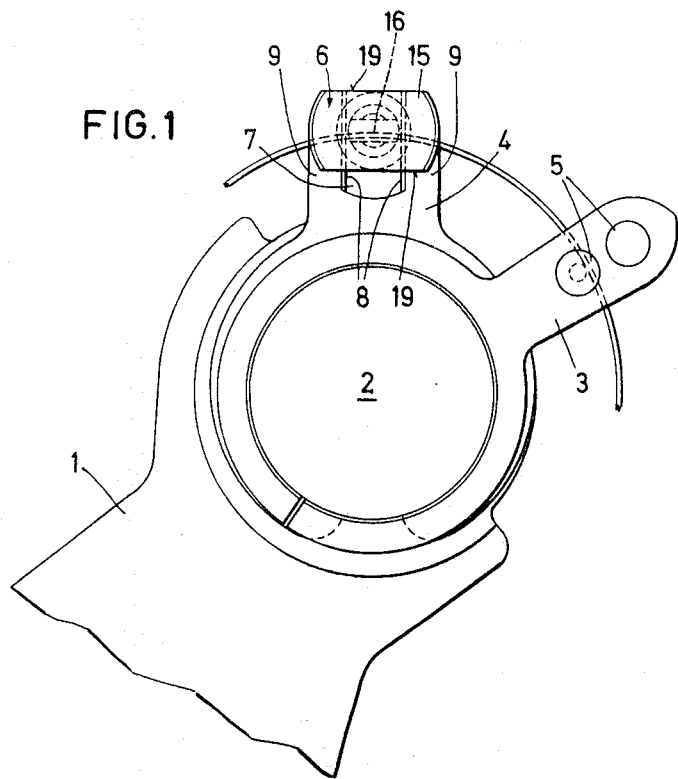
FIG. 1 is a plan view of that embodiment.

A regulator 3 and a stud holder 4 are mounted in the usual manner for rotary motion around an end-piece 2 fixed to the balance cock 1. While the regulator carries the conventional key and pin set 5, the stud holder is provided with a stud guiding slot 7 extending substantially in a radial direction with respect to the balance wheel and the hairspring. The side faces 8 of slot 7 are parallel. The stud holder 4 has overall substantially the same thickness so that it can advantageously be cut out from a thin sheet or band of a good springy material. Due to that possible choice of the stud holder material, the two arms 9 defining slot 7 between them have a good resiliency. The upper edges 10 and the lower edges 11 of the slot side faces 8 are rectilinear and evenly beveled over their whole length.

Stud 6 is provided with an annular groove 12 extending therearound. Groove 12 has a frusto-conical side face 13 and a plane side face 14 which is perpendicular to the stud axis. The groove side face 14 simultaneously constitutes the under face of a larger head 15 of stud 6. The frusto-conical groove side face 13 is substantially similarly inclined as the bevel of edge 11. To enable fixing the hairspring section 16 located at the outer end of its pulsing portion to stud 6 the latter comprises, at its end opposed to head 15, one the one hand, a bore 17 provided for receiving a glue drop (not shown), and, on the other hand, a diametrical slot 18 in which the hairspring section 16 is arranged so that the tangent plane to this hairspring will be at least approximatively parallel to slot 18.

The hairspring could obviously be fixed to stud 6 in another manner as advantageously as that represented in the drawing. The lower stud end could for instance be provided with a flat portion and the hairspring be fixed thereto by a welding point.

Figure 2:
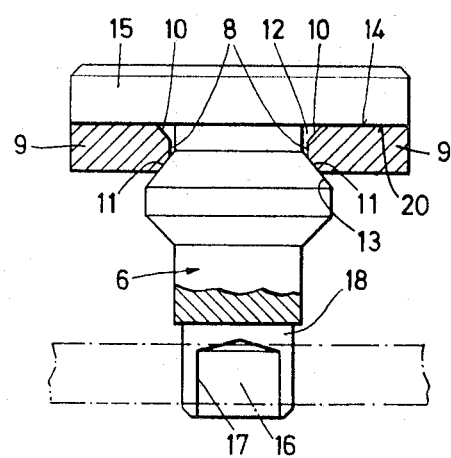
FIG. 2 is an elevational, partly sectional view of a part of FIG. 1.

The sizes of groove 12 relatively to those of arms 9 are chosen in such a manner that the resilient arms 9 will be slightly urged away from one another in a direction perpendicular to the balance wheel axis when stud 6 is inserted in slot 7, so that arms 9 will exert a nipping action on stud 6. However, the action of arms 9 shall not be exerted on the cylindrical bottom face of groove 12 but exclusively on the frusto-conical groove side face 13 through edges 11 of arms 9. According to that choice of the groove sizes arms 9 exert forces on stud 6 which have components along the stud axis. These components urge stud 6 downwards in FIG. 2, thus causing the under face of head 15 to be strongly pressed on the coplanar upper side surfaces 20 of arms 9. As a consequence thereof the alignment of stud 6 is perfectly ensured in that way, that in every position along slot 7, the stud will always be perpendicular to the stud holder 4 i.e., parallel to the hairspring axis.

To facilitate adjusting stud 6, two flat portions 19 are provided on head 15 parallel to groove 18.

The length of arms 9 is chosen in such a manner that their end faces will normally be flush with one flat portion 19 of stud head 15 when the hairspring is centered. It is the position represented in FIG. 1, in which head 15 leaves one portion of slot 7 uncovered.

The position of stud 6 relative to holder 4, which is represented in FIG. 1, is also that in which it will be set in place when assembling these parts. Should then the hairspring, contrary to the expectation, not be centered, the stud 6 would only need be shifted within slot 7. Shifting it toward the hairspring axis merely occurs by means of a usual screw driver, the blade of which is firstly pressed against the end faces of arms 9 and the flat portion 19 of stud head 15 being flush therewith, and then tilted like a lever about the arm ends serving as fulcrum. To shift stud 6 in the opposed direction one point of the usual tweezers need only be inserted into the uncovered portion of slot 7 and the tweezers then be handled like a lever while bearing against the slot end as fulcrum.

By rotating stud 6 around its axis, for instance by means of a tool having in its leading face a depression with a shape matching that of head 15. The hairspring can easily be caused to pulse in the correct manner between the key and the pin of set 5 of regulator 3. Although it does not appear advisable in a purpose of safety, the head 15 of stud 6 could of course also be provided with a slot like a screw thus enabling rotating the stud by means of a screw driver.

In addition to the simplification of the stud securing arrangement already pointed out hereabove, the improved arrangement according to the invention has still the following important advantages. Not only the distance of the stud from the balance axis, but also its orientation are easily adjustable. Moreover, the means ensuring locking the stud in adjusted position also garanty a precise alignment of the stud so that the hairspring remains flat and will not be distorted out of its plane although the stud holder is thin. Finally, the stud securing arrangement according to the invention involves an eccentric mass which is substantially lighter than with the arrangements hitherto known in the art, thus considerably reducing the risk of an inopportune rotation of the stud holder 4 about end-piece 2 in the case of an impact.

The stud securing arrangement according to the invention would still be advantageous if the stud guiding slot were provided not in an adjustable stud holder, but directly in a projection of the balance cock. The latter would then only have to be made overall with the same thickness so that it could be cut out of a sheet or band of a good springy material.

What I claim is:

1. In a watch set composed of a frame part and a hairspring stud being adjustably carried by and having an axis perpendicular to said frame part, the provision of an arrangement for securing the hairspring stud in adjusted position on said frame part, said arrangement comprising, in combination, a pair of resilient arms on said frame part and an annular groove in said stud being provided therearound, said groove having a plane side face perpendicular to the stud axis of a frusto-conical side face extending inwardly toward said plane side face, said frame part having overall substantially the same thickness and being integrally made with said arms out of a good springy material, each one of said arms having two plane side faces perpendicular to the stud axis, the plane side faces of said arms being coplanar in pairs, a guiding slot being defined by said arms and extending therebetween substantially in a radial direction with respect to the hairspring, said slot having parallel side faces on said arms, rectilinear edges being formed between each one of said side faces of the guiding slot and the plane side faces of the corresponding arm, said stud being inserted in and adjustable along and within said guiding slot thereby bending said arms by urging them slightly away from one another in a direction substantially perpendicular to the stud axis, said arms thus exerting a clamping action on said stud and securing it in that way in adjusted position, said clamping action occuring through the rectilinear edges of said arms lying in a first pair of coplanar side faces thereof and the second pair of coplanar side faces, the rectilinear edges lying in said first pair of coplanar side faces engaging said frusto-conical side face of the stud groove thereby exerting forces on said stud having components along the stud axis thus causing said plane side face of the stud groove to be pressed on said second pair of coplanar side faces of said arms.

2. In the securing arrangement according to claim 1, said hairspring stud comprising a larger head portion having a plane lower face constituting said plane side face of the stud groove.

3. The securing arrangement according to claim 2, said hairspring stud having a hairspring portion secured thereto, and two diametrically opposed flat sections being formed on said head portion and extending in parallel with said hairspring portion secured to said stud.

4. In the securing arrangement according to claim 1, said rectilinear edges of said arms being evenly beveled.

5. The securing arrangement according to claim 4, in which said frame part is mounted for rotary motion coaxially to the hairspring.

* * * * *